United States Patent [19]
Beck

[11] 3,747,686
[45] July 24, 1973

[54] APPARATUS FOR HARVESTING SOD

[76] Inventor: Martin Beck, P.O. Box 752, Auburn, Ala. 36830

[22] Filed: July 24, 1970

[21] Appl. No.: 57,933

[52] U.S. Cl. .......... 172/20, 172/40, 172/68, 172/101, 172/676
[51] Int. Cl. .......... A01b 45/04
[58] Field of Search .......... 172/19, 20; 47/9; 56/344, 432; 242/64, 67.1, 56 A, 59, 86.52

[56] References Cited
UNITED STATES PATENTS

| | | | |
|---|---|---|---|
| 3,481,556 | 12/1969 | McDonnell | 242/86.52 |
| 3,509,944 | 5/1970 | Brouwer et al. | 172/19 |
| 2,880,943 | 4/1959 | Stephens | 242/67.1 |
| 2,778,292 | 1/1957 | Kavan | 172/20 |
| 2,617,347 | 11/1952 | Provdst | 172/20 |
| 3,164,211 | 1/1965 | Scott | 172/19 |
| 3,034,586 | 5/1962 | Ditter | 172/19 |
| 3,369,766 | 2/1968 | Herman | 242/56 A |

Primary Examiner—Robert E. Pulfrey
Assistant Examiner—R. T. Rader
Attorney—Beale and Jones

[57] ABSTRACT

An apparatus for cutting a plurality of strips of sod and for winding the resultant strips of sod on a reel is disclosed.

11 Claims, 10 Drawing Figures

INVENTOR
MARTIN BECK

BY Jones and Lockwood
ATTORNEYS

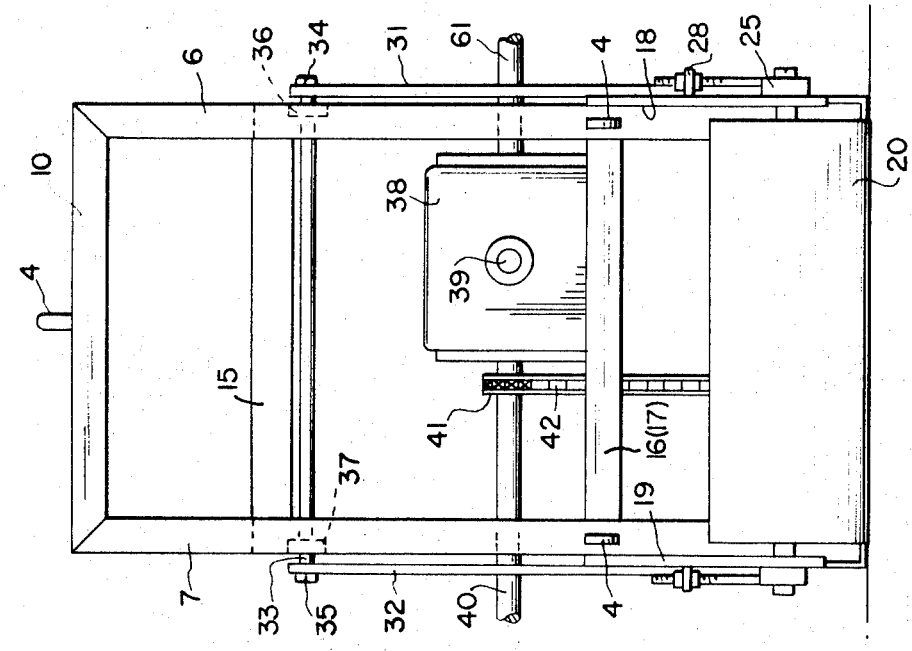
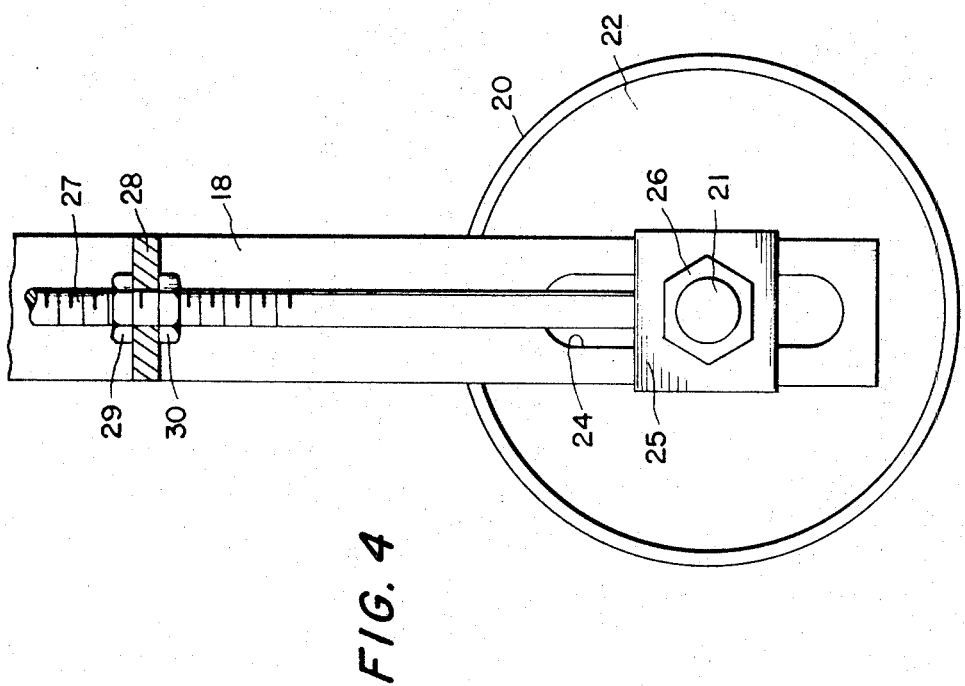

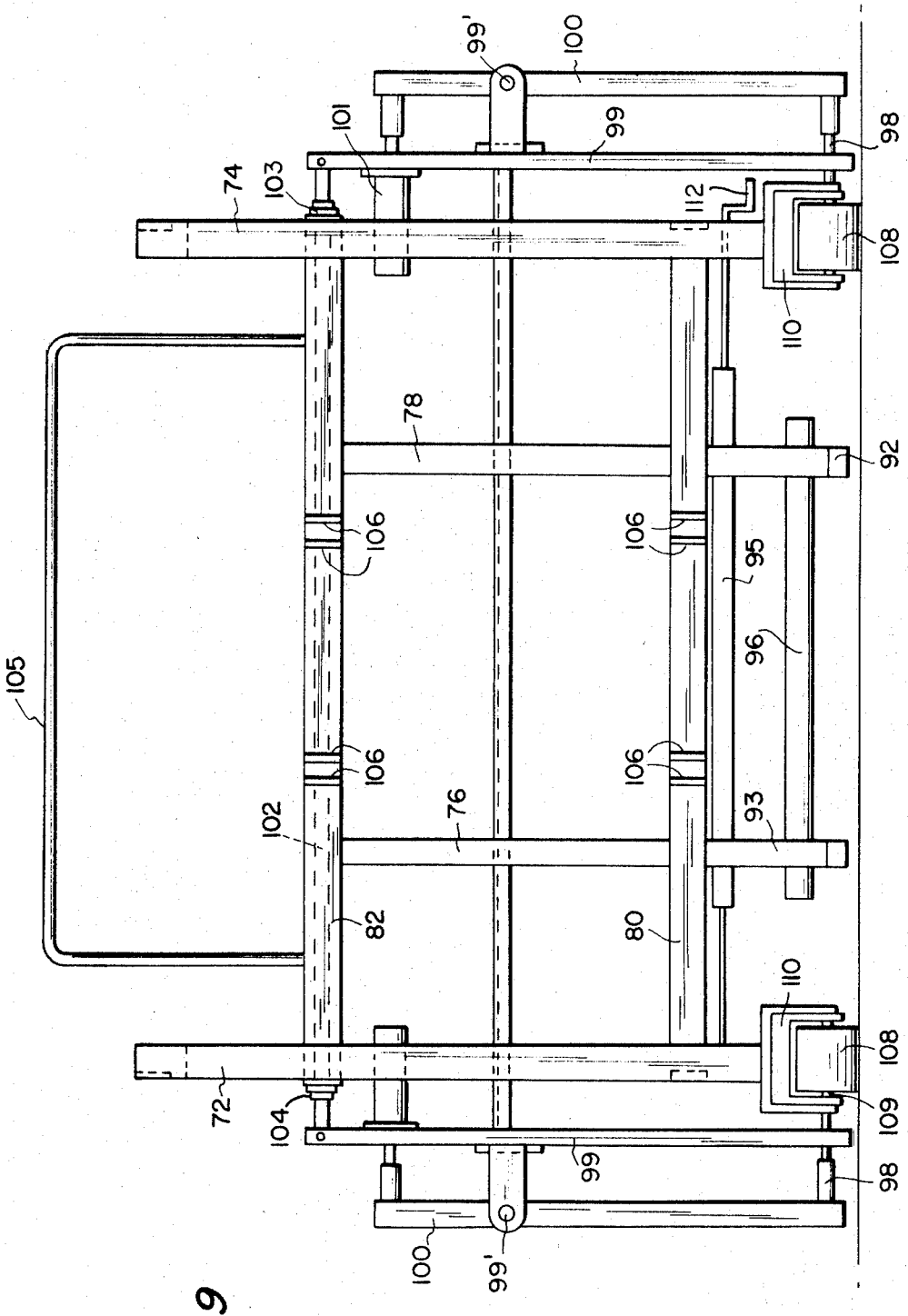

APPARATUS FOR HARVESTING SOD

RELATED DISCLOSURES

This application is related to Ser. No. 605, filed on Jan. 5, 1970, and now abandoned, and to Ser. No. 57,930, filed on even date herewith and entitled "Method and Apparatus For Sod Harvesting and Laying"; the teachings therein being incorporated herein by reference.

FIELD OF THE INVENTION

The present invention relates, in general, to sod handling and, more particularly, to an apparatus for harvesting strips of sod which are too large for manual handling. Even more particularly, this invention relates to an apparatus for cutting a plurality of strips of sod and winding the resulting strips on a reel.

As pointed out in the above-mentioned related applications, lawn grass sod is conventionally cut into blocks which are stacked flat, or into strips which are folded or rolled upon themselves and stacked on a pallet or truck. The blocks generally vary in width from about 12 inches to about 18 inches and in length from about 18 inches to about 4 feet. Similarly, the strips are generally from about 12 inches to about 24 inches in width and from about 6 feet to about 9 feet in length. At any rate, the blocks and strips are always small enough to enable manual laborers to stack them on a pallet or on a truck during harvesting, and to remove them from the pallet or truck at a job site, whereat they are manually placed edge-to-edge and end-to-end as they were harvested from a sod field. In an attempt to overcome the uneconomic, slow and sometimes unreliable dependence upon manual labor, various sod handling machines have been developed. Generally speaking, these machines cut and/or convey small blocks or strips of sod up an inclined moving belt where they can easily be reached by manual laborers for stacking on a pallet or truck. While such machines do eliminate a considerable amount of walking and bending during the harvesting of sod, they still require the use of substantial manual labor. Furthermore, since such machines do not eliminate or diminish the need for manual labor when the stacked sod is laid, their use is substantially ineffective for reducing the cost and time consumption required in the overall process of harvesting and laying lawn sod.

SUMMARY OF THE INVENTION

The present invention overcomes the difficulties and deficiencies of the prior art by providing an apparatus which contemplates the handling of significantly larger strips of sod than have been handled in the prior art. The present invention also contemplates the use of suitably designed machines for replacing a portion of the time-consuming and uneconomical manual labor required in the prior art.

In accordance with the present invention, there is provided a sod harvesting apparatus comprising a suitably powered cutting unit capable of cutting lawn grass sod into relatively long strips of suitable width and length, and a cooperating sod collecting unit which substantially continuously winds the resulting strips of sod on a reel to form a sod roll of the type described in applicant s above-mentioned related applications.

Generally speaking, the herein contemplated apparatus comprises a movably mounted super-structure or framework which supports one or more generally parallelly arranged oscillating cutting bars adapted to strip one or more ribbons of sod. Typically, sod is desired in widths of 12 inches, 18 inches, or 2 feet. Accordingly, the herein contemplated apparatus may conveniently comprise three 18 inch cutting bars, four 2 foot cutting bars, six 12 inch cutting bars and the like. In a preferred embodiment, the location of the cutting bars relative to the ground is adjustable so that the sod may be cut to a predetermined thickness. This may be accomplished, for example, by providing the super-structure of the apparatus with adjustable rollers which simultaneously provide a rolling support for the apparatus and a depth adjustment for the cutting blades.

The sod collecting portion of the apparatus comprises a receptacle or chamber for storing reels of the type described in the above-mentioned related applications. In a preferred embodiment, the storage chamber is provided with a suitable indexing device to ensure that only one reel at a time is dispensed from the chamber and onto the ends of the pre-cut ribbons of sod being collected. The apparatus also comprises a reel gripping mechanism which is pivotally mounted to the reel storage chamber and which, in turn, rotatably grips the reel during sod collection and rolls the reel over the pre-cut sod.

To initiate sod harvesting, the herein contemplated apparatus may be mounted behind a tow vehicle such as tractor and advanced a sufficient distance such that the leading edge of the sod being stripped is disposed below the reel storage chamber. At this point, the forward movement of the tractor is stopped, and a reel is dispensed from the chamber. The reel is then gripped by the above-mentioned gripping device and positioned on the leading edge of each pre-cut strip of sod whereafter a sufficient length of each strip of sid is looped or wound over the reel to form the first convolution of a sod roll. In this connection, the term "sod roll" as used herein is meant to describe both a reel containing one strip of sod wound thereon and a reel containing a plurality of strips of wod wound thereon. The forward movement of the tractor is again commenced, whereupon additional lengths of sod are stripped and simultaneously wound on the reel until the desired length of each pre-cut strip of sod is rolled thereon. The strips are then cut to length by any convenient means. During the rolling operation, pressure may be applied to the reel to provide the necessary friction required with the ground. In a preferred embodiment of the present invention, the reel gripping device may be provided with a handle or lever to facilitate pivotal movement thereof relative to the reel storage chamber, preferably by a laborer walking alongside the apparatus.

After the strips of sod have been rolled onto the reel, another reel may be dispensed from the storage chamber and the harvesting operation repeated. As pointed out in the above-mentioned related applications, the resultant sod rolls which comprise both the strips of sod and the reel, may be lifted to a truck for transportation to a job site. The sod rolls may be lifted to the truck by any conventional device, such as, for example, a fork lift equipped with a single lifting rod that is inserted into the reels. After being transported to a job site, the sod rolls are removed from the truck with a similar fork lift, for example, and placed on the ground where the sod is to be laid. The reels are then advanced to unroll the strips of sod therefrom, thereby laying the sod smoothly on the ground. When the end of each roll is reached, the reel may be removed and used again for further sod harvesting.

BRIEF DESCRIPTION OF THE DRAWINGS

The novel features which are characteristic of the invention are set forth with more particularity in the appended claims, but the various objects and features of the invention will be more fully and clearly understood from the following detailed description, taken in conjunction with the drawing, in which:

FIG. 4 is an enlarged elevational view of that portion of the center-most cutting section of FIG. 3 which controls the position of the support roller relative to the remainder of the apparatus;

FIG. 5 is a front elevational view of the center-most cutting section of FIG. 3;

FIG. 7 is a front elevational view of the right side cutting section of FIG. 6;

FIG. 9 is a front elevational view of the sod collecting unit of FIG. 8; and

DETAILED DESCRIPTION

Figure 1:
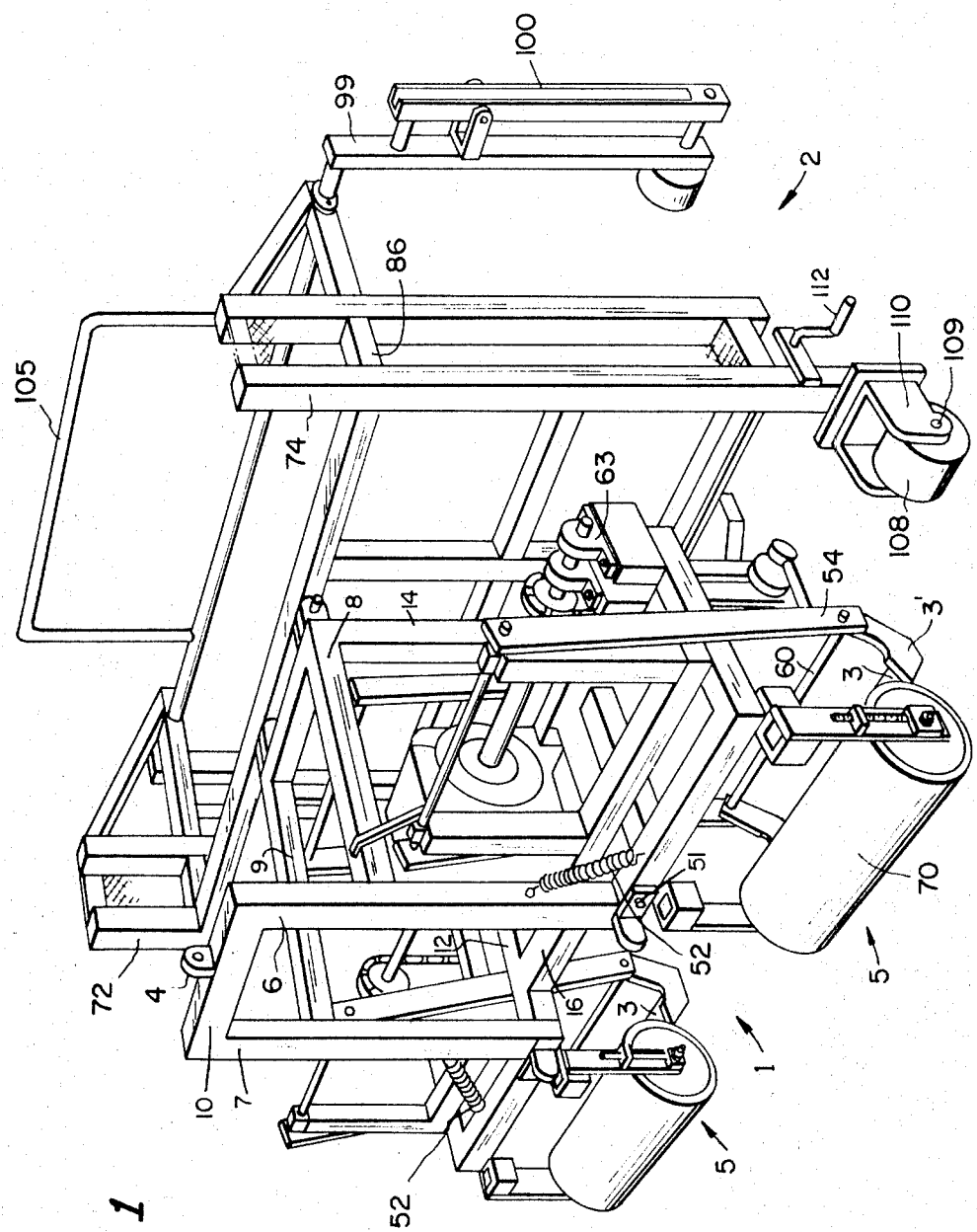
FIG. 1 is a perspective view, with portions removed for the sake of illustration, of a sod harvesting apparatus embodying certain principles of the invention.
Figure 2:
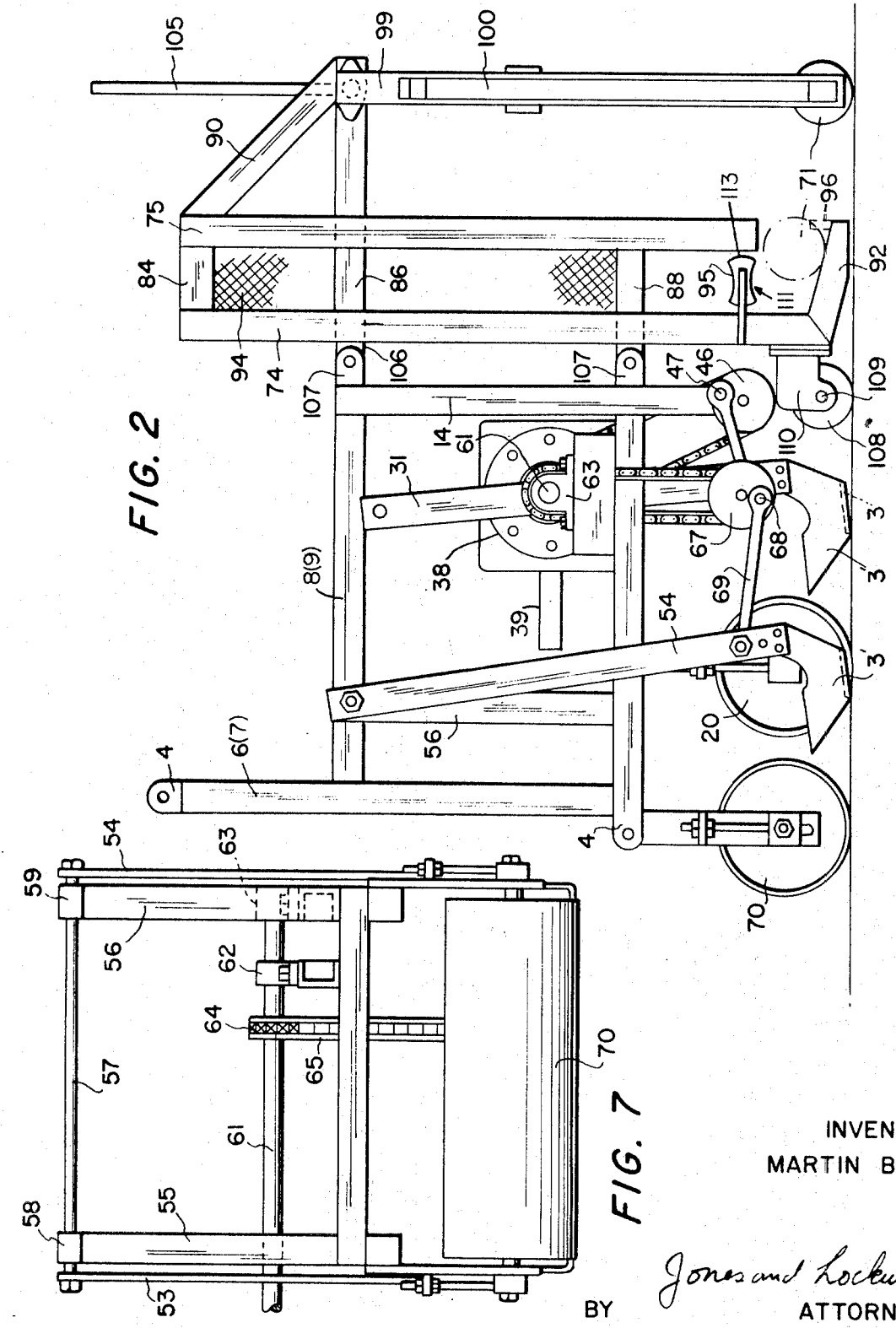
FIG. 2 is a side elevation of the apparatus of FIG. 1.

Referring to the drawings, there is shown one embodiment of a sod harvester incorporating the principles of the present invention. As shown, the sod harvester comprises a suitably powered sod cutting unit 1 capable of simultaneously cutting several ribbons or strips of sod, and a cooperating sod collecting unit 2 which substantially continuously winds the resulting strips of sod on a reel to form a sod roll of the type described in applicant's copending application Ser. No. 57,930 filed on even date herewith and entitled "Method and Apparatus for Sod Harvesting and Laying."

The sod cutting unit 1, which for the purposes of illustration may comprise three generally parallelly arranged cutter bars 3—3, and the sod collecting unit 2 typically comprise a super-structure or frame provided with hitching mounts 4—4 for connecting the frame to a towing vehicle such as a tractor (not shown). The frame may be movably supported on the ground, for example, by five bearing mounted drums or rollers 5—5 associated with the various portions of the frame. The configuration of the frame and the manner in which it is movably supported are generally unimportant so long as the frame provides sufficient strength and rigidity to support the various elements involved, and so long as it does not interfere with the movement of the cutter bars and the like, and with the respective drive means associated therewith. Thus, the frame may suitably comprise steel angle irons or square tubing arranged in the configuration illustrated in the drawings. In latter connection, and for the sake of clarity, the various components which comprise the frame will be described in connection with the particular components they support.

SOD CUTTING UNIT

As illustrated, the sod cutting unit 1 comprises three separate cutting bars or blades 3—3 mounted to different portions of the frame. Accordingly, the sod cutting unit will be hereinafter described as comprising a central cutting section associated with a central frame portion, a left cutting section associated with a left frame portion, and a right cutting section associated with a right frame portion. It will be appreciated, of course, that the description hereinbelow pertains only to an embodiment of the present invention containing three cutting bars, and that embodiments including fewer and greater than three cutting bars are contemplated.

CENTRAL CUTTING SECTION

Figure 3:
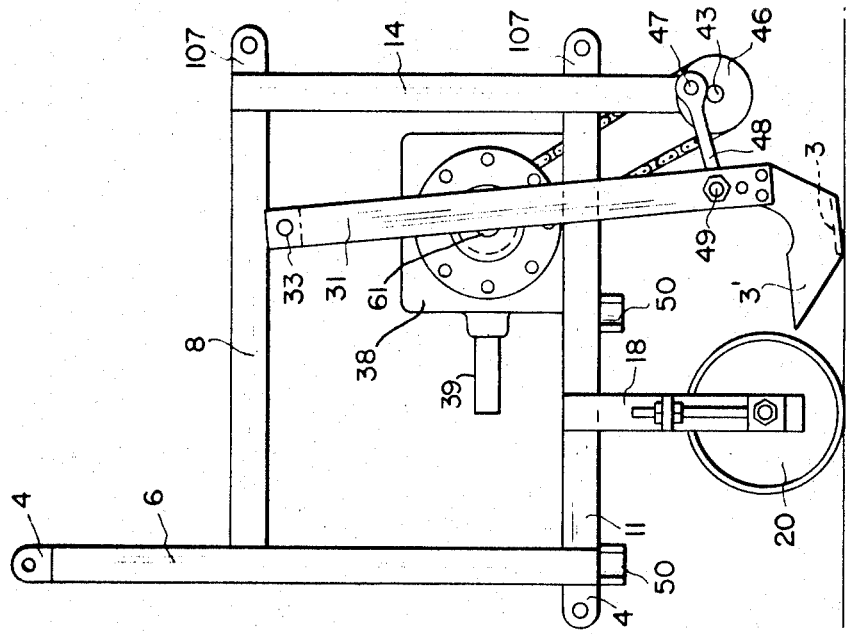
FIG. 3 is a partial side elevational view of the apparatus of FIG. 1, illustrating the center-most cutting section thereof.

Referring to FIGS. 3, 4 and 5, the central cutting section comprises a cutting bar 3 pivotably mounted to a roller supported central frame portion. As illustrated, the central frame portion comprises a generally cube-shaped configuration made up of steel support arms 6-17. The central frame portion also comprises a pair of vertically extending support arms 18 and 19 adapted to receive a roller 20 for movably supporting the central frame portion on the ground. As shown in FIG. 4, the roller 20 may comprise a hollow reel or cylinder equipped with a pair of welded end plates 22. Each of the end plates 22 is provided with a bearing for receiving an axially disposed shaft 21 which passes completely through the cylinder. In this manner, linear movement of the shaft 21 is transmitted through the bearings mounted in the end plates 22 and thus to the roller 20 which then rolls about the shaft and along the ground. In a preferred embodiment, the distance between the roller 20 and a plane passing through support arms 11 and 12, for example, is adjustable so as to control the vertical position of the cutting bar 3 and thus the thickness of the sod being harvested. As shown most clearly in FIG. 4, this may be accomplished by passing the axially extending portions of shaft 21 through vertically oriented channels or slots 24—24 provided in support arms 18 and 19. Mounting members 25—25 adapted to slide up and down along the support arms 18 and 19 are secured to the ends of the shaft 21. In one embodiment, the ends of the shaft may be threaded and the mounting members secured thereto with a suitable fastener such as a hexagonal nut 26. A threaded rod 27 is secured to each of the mounting members. The rod 27 extends vertically from each mounting member and passes through a bracket 28 secured to each of support arms 18 and 19. A pair of hexagonal nuts 29 and 30 are threaded on rod 27 on either side of the bracket 28 such that suitable manipulation of the nuts 29 and 30 will provide positive control over the position of the respective mounting members 25—25 and thus the roller 20, relative to the brackets 28—28.

The cutting bar 3 comprises an elongated substantially flat blade designed to strip a substantially uniformly thick veneer of sod. The cutting blade also comprises a pair of vertically extending knife-edges 3' which cut the veneers of sod to a predetermined width. As shown, the cutting bar is mounted substantially parallel to the axis of the roller 20 by means of a pair of generally vertically extending support arms 31 and 32 mounted to the vertically exztending portions 3' of the cutting blade 3. The support arms 31 and 32 are connected to each other by means of a rod 33 passing through a bore near the top of each arm. In one embodiment, the ends of the rod may be threaded, whereby the rod may be secured to the support arms by a pair of nuts 34 and 35 threaded over the portions of the rod which extend through the bores. In a preferred embodiment, the rod 33 is pivotably mounted to the central frame portion, for example, by passing the rod through suitable bearings 36 and 37 mounted on support arms 8 and 9, respectively, so that pivotal movement of the rod 33 will result in a pendular movement of the cutting bar 3. It will be appreciated that the distance between the rod 33 and the cutting bar 3 can be made sufficiently great so that the movement of the cutting bar will be substantially rectilinear. Such movement is desirable since it will facilitate the cutting action of the bar 3 as it passes through the sod being cut.

It will be appreciated that the pivotal movement of the cutting bar 3 may be accomplished by utilizing the towing vehicle as the source of power. For example, if a tractor is employed as the towing vehicle, the power take-off shaft of the tractor (not shown) may be connected through suitable gear and drive means to the cutting bar 3. As illustrated, this may be accomplished by supporting a suitable gear box 38 on the central frame portion and by arranging the power input shaft 39 thereof for connection with the power take-off shaft of the tractor. A power output shaft 40 of the gear box 38 is provided with a pulley 41 (FIG. 5) and chain 42 to drive a bearing-mounted crank shaft 43 (FIG. 3), the latter being supported by arms 44 and 45. The crank shaft 43 is provided with a plate or disc 46—46 on each end thereof; and each disc is provided with an eccentric pin 47—47. A connecting rod 48 is secured at one end thereof to the eccentric pin, while the other end of the rod 48 is secured through suitable bearing means to a rod 49 passing between the support arms 31 and 32 near the cutting blade 3. In this manner, power transmitted from the tractor to the input shaft 39 of the gear box 38 is converted into substantially rectilinear reciprocating movement of the cutting bar 3.

RIGHT SIDE CUTTING SECTION

Figure 6:
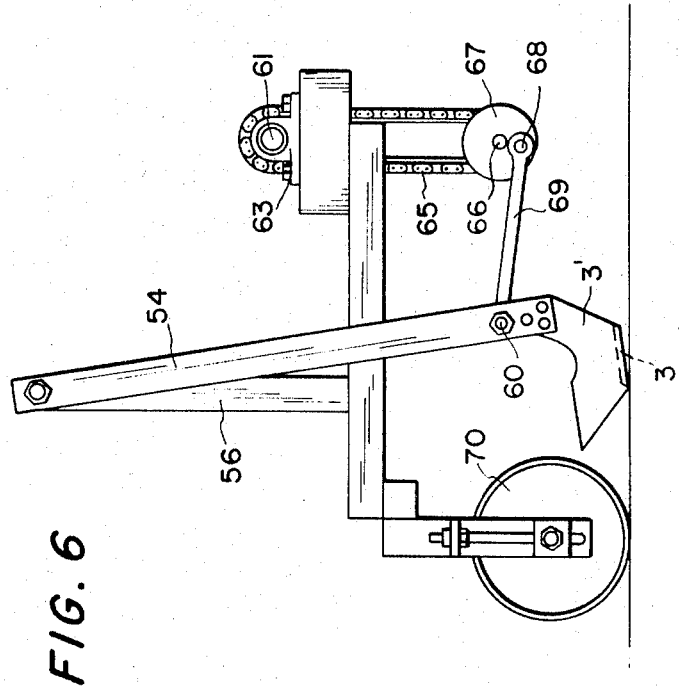
FIG. 6 is a partial side elevational view of the apparatus of FIG. 1, illustrating the right side cutting section thereof.

Support arm 11 is provided with a pair of generally U-shaped brackets 50—50 for pivotably connecting the right frame portion to the central frame portion. The brackets 50—50 are disposed near the front and rear of support arm 11 and are typically provided with aligned bores adapted to receive a rod 51 which forms part of the right frame portion. Referring to FIGS. 6 and 7, the right frame portion generally comprises a horizontally disposed rectangular configuration of support arms adapted for rolling support in the manner previously described. It will be appreciated, of course, that the pivotal connection between the central frame portion and the right frame portion enables the separate cutting sections to cut sod having a fairly uniform thickness, even on relatively rolling terrain. In a preferred embodiment, a compressed spring 52 or some other suitable means is connected between the central and right frame portions to distribute some of the weight of the central cutting section to the right frame portion.

The right cutting section is provided with a cutting bar 3 that is identical to the cutting bar associated with the central cutting section. The cutting bar 3 is rigidly mounted to a pair of support arms 53 and 54 which, in turn, are pivotably mounted to arms 55 and 56 of the right frame portion. In one embodiment, this is accomplished by mounting a rod 57 in bearings 58 and 59 disposed on support arms 55 and 56, respectively, and then connecting the ends of the rod 57 to arms 53 and 54. A second rod 60 is connected between the support arms 53 and 54 near the cutting bar 3 to facilitate pendular reciprocating movement of the bar in much the same manner as described above. Thus, a second output shaft 61 of the gear box 38 is mounted in suitable bearings 62 and 63 disposed on the right frame portion, and is provided with a pulley 64 and chain 65 to drive a crank shaft 66. The crank shaft 66 is provided at each end thereof with a plate 67 having an eccentric pin 68. As described above, a rod 69 connected to the eccentric pin 68 and to the rod 60 disposed between the support arms 53 and 54 transmits the rotary movement of the crank shaft 66 into substantially rectilinear movement of the cutting bar 3. As is the case with the central cutting section, the thickness of the sod stripped by the right cutting section is controllable by adjusting the position of the roller 70 and thus the right side cutting bar, relative to the right frame portion.

LEFT CUTTING SECTION

The left cutting section is substantially a mirror image of the right cutting section and need not be described in detail. The numerals employed to identify the various portions of the right cutting section are also employed to identify their counterparts in the left cutting section.

SOD COLLECTING UNIT

Figure 8:
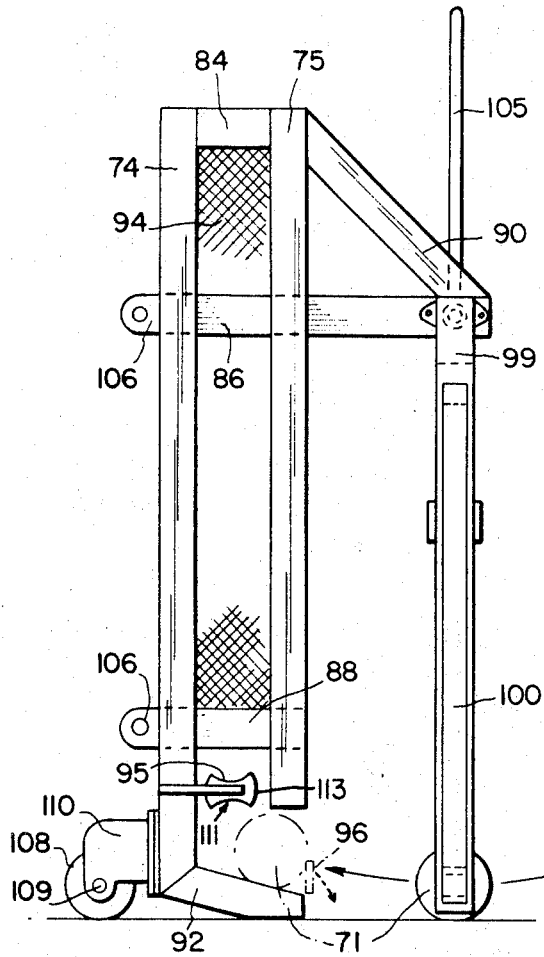
FIG. 8 is a partial side elevational view of the apparatus of FIG. 1, illustrating the sod collecting unit.
Figure 10:
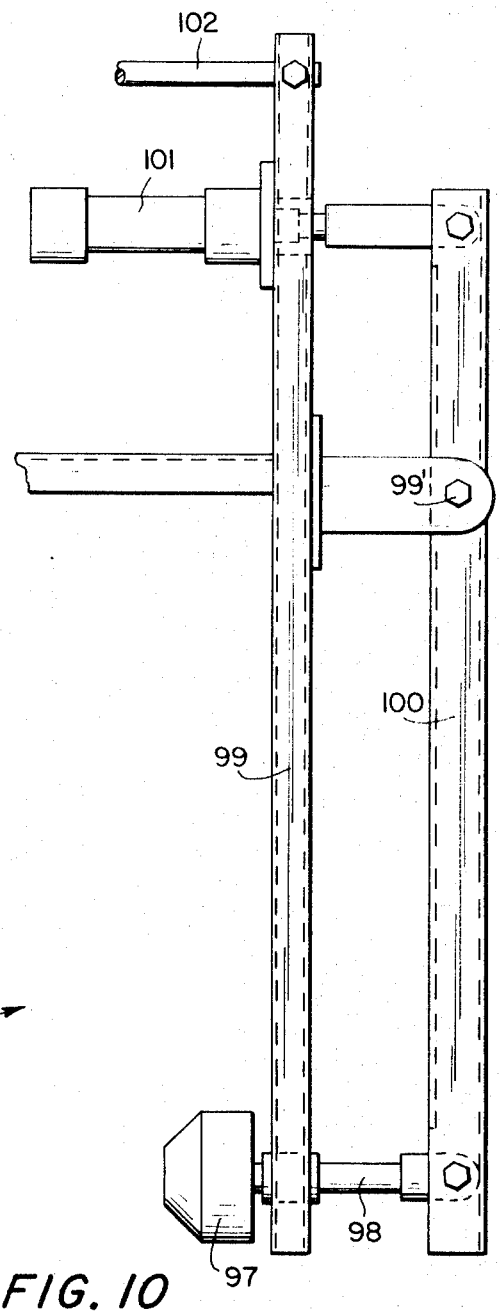
FIG. 10 is a partial front elevational view of the sod collecting unit of FIG. 8, illustrating the manner in which the plug members are pivoted for insertion into the reels in preparation for sod collecting.

Referring to FIGS. 8–10, the sod collecting unit 2 generally comprises an arrangement for storing one or more reels 71 of the type described in applicant's above-mentioned copending application, and for gripping and rolling such reels over the strips of sod cut by the sod cutting unit 1 so as to form sod rolls comprising the reels and convolutions of sod.

The sod collecting unit 2 may comprise a configuration of support arms 72–93 which defines a receptacle or storage chamber 94 for the reels 71. As shown, a hand rotatable indexing device 95 is disposed near the otherwise open bottom of the chamber 94 to dispense one reel 71 at a time into engagement with a spring-biased stop plate 96 designed to position the reel 71 for engagement with the reel gripping mechanism. Referring to FIGS. 8 and 9, the indexing device 95 may comprise an elongated, generally cylindrical member having one or more concave surfaces 111 for supporting a reel 71. The dimensions of the indexing device 95 are so chosen such that when a reel 71 is resting on a concave surface 111 and the handle 112 (FIG. 9) is turned to so as to rotate the device 95, the reel 71 will be carried by the device 95 and dropped onto the support arm 92. During such rotation, one of the convex portions 113 of the device (depending, of course, on the direction in which the device is rotated) will engage the next succeeding reel 71 and prevent the same from dropping from the storage chamber 94. Continued rotation of the handle 112 will result in the next succeeding reel 71 becoming seated in a channel 111 on the device 95, whereafter the reel dispensing operation may be repeated as desired. It will be appreciated that any convenient means for facilitating the delivery of one reel at a time from the storage chamber 94 may be employed.

The reel gripping mechanism may comprise a pair of rotatable plug members 97—97 which are mounted for insertion onto the ends of the reel 71 such that the plug members will rotate in unison with the reel as the latter is pulled and thus rolled along the ground. As illustrated in FIG. 10, each of the plug members 97 is rotatably fitted on a mounting shaft 98 that passes through a bore in a vertically oriented support arm 99, the latter being connected to the reel storage chamber 94 for pivotal movement about an axis parallel to the axis of the reels. In addition, each of the mounting shafts 98 is connected to a support member 100 which is disposed parallel to the support arm 99 and which is pivotably connected thereto by pin 99' for movement about an axis normal to the axis of the reels. In this manner, the support arms 99 may be moved both transversely and longitudinally with respect to the reel 71 so that the rotatable plug members 97 may be aligned with and inserted into the respective ends of the reel. As will be evident from the foregoing, the plug members 97 could be inserted into the reel by hand. However, as shown in FIG. 10, for example, a conventional hydraulic cylinder and piston device 101 may be connected between the support member 100 and the support arm 99 to provide the above described pivotal movement of arm 100 about pin 99'.

A rod 102 which is connected to the respective support arms 99—99 to impart synchrous pivotal movement thereto passes through suitably disposed bearings 103 and 104 in support arms 86 and 87, respectively. In a preferred embodiment, the rod 102 is provided with a U-shaped handle 105 which may be used by an operator to facilitate aligning the opposed plug members 97—97 with the reel. After the plug members have been inserted into the reel, the operator may move the reel to the position shown in FIG. 10 simply by pushing on the handle 105 in a counter-clockwise direction (FIG. 8). Obviously, the operator must push on the handle 105 with sufficient force to overcome the bias on the spring loaded plate 96.

The sod collecting unit 2 may be rigidly connected to the sod cutting unit 1 and, in fact, may comprise an integral part thereof. However, the sod collecting unit 2 is preferably provided with a plurality of brackets 106—106 on each of support arms 80 and 82 (FIG. 9) designed to cooperate with mutually opposing brackets 107—107 mounted to support arms 15 and 17 of the sod cutting unit 1. In this latter connection, it has been found advantageous to provide the various brackets 106-107 with aligned apertures such that generally horizontally disposed rods may be utilized to pivotably connect the sod cutting and collecting units, and thus enable more efficient operation on relatively rough terrain.

The sod collecting unit 2 may be supported by adjustable rollers as described above. However, since there is no pressing need for employing adjustable rollers, the sod collecting unit may be supported by employing relatively simple bearing-mounted rollers 108 which are spaced apart so as to provide an adequate base. Thus, an appropriate roller may comprise a hollow drum provided with a pair of plug members having axially aligned bores for receiving a bearing-mounted shaft 109. The ends of the shaft 109 may be pinned or otherwise fastened to a suitably shaped mounting bracket 110 connected, for example, to support arm 72 (FIG. 9). A similar roller may be fastened to support arm 74 to provide an adequate base for the collecting unit 2.

A suitable cutting bar (not shown) may be mounted to the sod cutting unit 1 or to the sod collecting unit 2 to cut the strips of sod to length. In the alternative, the sod may be cut to length by any suitable means such as a cutting edge operated manually by a laborer walking alongside the collecting unit.

OPERATION

In the utilization of the illustrated apparatus, one or more reels 71 are placed in the storage chamber 94. The cutting depth of the blades 3 is adjusted by setting the height of the respective rollers 20 and 70. A three-point hitch of a tractor (not shown) is connected to the hitching mounts 4—4 on the front of the cutting unit 1, and the power take-off shaft of the tractor is connected to the input shaft 39 of gear box 38. The indexing device 95 is rotated to dispense a reel 71 against the spring-biased stop plate 96. The apparatus is now ready for sod harvesting.

To initiate the harvesting operation, the tractor is advanced a few feet. During such advancement, the power output shafts 40 and 61 of the gear box 38 drive the crank shafts 43 and 66 and thereby oscillate the cutting bars 3—3. After the leading edges of the strips of sod cut by the bars 3—3 reach the collecting unit 2, the forward movement of the tractor is stopped. An operator then grasps the handle 105 attached to the connecting rod 102 and pivots the support arms 100 until the end plugs 97 are aligned with the openings of the reel 71. The piston and cylinder device 101 is then actuated to insert the plugs 97 into the reel 71, whereafter the operator urges the handle 105 toward the tractor to overcome the bias of the stop plate 96 and thereby position the reel over the edges of the newly started strips of sod. A sufficient length of each strip of sod is then looped or wound over the reel 71 to form the first convolution of a sod roll. It should be noted that when the reel 71 is provided with spikes as described in applicant's above-mentioned related applications, the initial looping of the sod may not be necessary since merely rolling the spiked reel on the sod is generally sufficient to initiate the formation of a sod roll. At any rate, the tractor is again moved forwward, whereupon additional lengths of sod are (1) but by the reciprocating or oscillating blades 3—3 and (2) simultaneously wound on the reel 71. As shown in FIG. 8, the support arms 99 of the reel gripping mechanism pivot away from the cutting unit 1 as the diameter of the sod roll increases. When the desired length of sod has convoluted on the reel 71, the sod is cut to length. The tractor is then advanced slightly so that the trailing edges of the convoluted strips of sod are fully wound on the reel. The cylinder and piston device 101 is again actuated to withdraw the plugs 97 from the reel, whereafter the apparatus is ready for another harvesting cycle.

Thus, there has been provided a novel and useful apparatus for handling sod which will significantly reduce the manual labor required in a sod harvesting operation. Although the invention has been described with respect to certain specific embodiments, it will be apparent that many variations and modifications of the basic concept can be devised. For example, it is to be understood that this concept is not limited to tractor-mounted devices, but that special machines could be built which would integrally contain the above-described cutting and collecting units. Furthermore, cutting units comprising more than three cutting bars can be devised. Therefore, it is desired that the foregoing description be taken as illustrative, and that the scope and extent of the invention be limited only to the following claims.

What is claimed is:

1. An apparatus for harvesting at least one strip of sod comprising:

a base movably supported on the ground, a portion of said base defining a storage chamber for at least one elongated reel that is substantially hollow at opposing ends thereof;

an elongated cutting bar pivotably mounted to said base for substantially reciprocatory movement in the longitudinal direction of the sod being harvested, said cutting bar being adapted to strip a predetermined width of sod when said base is advanced in said longitudinal direction;

means mounted to said base for reciprocating said cutting bar while said cutting bar is advanced in said longitudinal direction;

means mounted to said base for supporting said elongated reel on the ground for advancement with said base and for rotation about the longitudinal axis of said reel, said means comprising:

a first elongated support arm disposed substantially parallel to said reel and pivotably connected to said base for movement about an axis substantially parallel to the axis of said first support arm;

a second support rotatably connected at a first end thereof to a first end of said reel, and connected at a second end thereof to said first support arm;

a third support arm rotatably connected at a first end thereof to a second end of said reel, and connected at a second end thereof to said first support arm, said second and third support arms being substantially parallel to each other such that said first, second and third support arms together with said reel, define a generally rectangular configuration which is pivotably connected to said base;

a fourth support arm disposed substantially parallel to said second support arm and pivotably connected thereto for movement about an axis substantially perpendicular to the axis of said reel;

first rotatable plug means adapted for insertion into said first end of said reel, said first plug means having a first axial shaft extending therefrom and through a bore provided in said first end of said second support arm for rotatably and slidably receiving said first shaft, said first shaft being connected to a first end of said fourth support arm;

means connected between a second end of said fourth support arm and said second support arm for selectively pivoting said fourth support arm relative to said second support arm and thereby inserting said first plug means into said first end of said reel;

a fifth support arm disposed substantially parallel to said third support arm and pivotably connected thereto for movement about an axis substantially perpendicular to the axis of said reel;

second rotatable plug means adapted for insertion into said second end of said reel, said second plug means having a second axial shaft extending therefrom and through a bore provided in said first end of said third support arm for rotatably and slidably receiving said second shaft, said second shaft being connected to a first end of said fifth support arm; and means connected between a second end of said fifth support arm and said third support arm for selectively pivoting said fifth support arm relative to said third support arm and thereby inserting said second plug means into said second end of said reel, the axis of said first elongated support arm being disposed substantially parallel to said cutting bar such that when said base is advanced to strip said sod and when a sufficient length of said strip of sod is looped over said reel to begin a sod roll, the advancing reel will roll on the stripped sod and collect convolutions thereof so as to form a sod roll comprising said reel and the now convoluted sod.

2. The combination of claim 1 further including handle means rigidly connected to said first support arm, said handle means providing leverage for reducing the force required to pivot said generally rectangular configuration about said first support arm.

3. The combination of claim 2, wherein said means for selectively pivoting said fourth support arm relative to said second support arm comprises a first cylinder and piston device mounted between said second and fourth support arms, and wherein said means for selectively pivoting said fifth support arm relative to said third support arm comprises a second cylinder and piston device mounted between said third and fifth support arms.

4. The combination of claim 1, including a plurality of substantially parallelly disposed cutting bars adapted to strip substantially adjacent strips of sod.

5. The combination of claim 4, including means for adjusting the vertical position of the cutting bars relative to the ground so as to control the thickness of the sod being stripped.

6. The combination of claim 5, wherein said base is movably supported on a plurality of cylindrical rollers disposed substantially parallel to said cutting bars.

7. The combination of claim 6, wherein each of said cutting bars is disposed behind a support roller, the direction in which the base is advanced during cutting being the forward direction, and wherein each of said support rollers is sub-stantially equal in length to the length of the cutting bar disposed therebehind.

8. The combination of claim 6, wherein said means for adjusting the vertical position of said cutting bars comprises adjustable mounting means for selectively controlling the vertical position of the axis of each of said support rollers relative to said base.

9. The combination of claim 8, wherein each of said rollers comprises a bearing-mounted shaft extending axially therefrom, and wherein said adjustable mounting means for controlling the position of the axis of each roller comprises:

a pair of vertical support members extending downwardly from said base and spanning each roller, each of said support members having a vertically disposed slot therethrough for receiving an opposing end of said bearing-mounted shaft; and means connected to each of said opposing ends for selectively raising and lowering said shaft in the vertically disposed slot disposed in each of said support members.

10. The combination of claim 1 further including handle means rigidly connected to said first support arm, said handle means providing leverage for reducing the force required to pivot said generally rectangular configuration about said first support arm.

11. The combination of claim 10 wherein said means for selectively pivoting said fourth support arm relative to said second support arm comprises a first cylinder and piston device mounted between said second and fourth support arms, and wherein said means for selectively pivoting said fifth support arm relative to said third support arm comprises a second cylinder and piston device mounted between said third and fifth support arms.

* * * * *